Oct. 17, 1950  W. R. BATTLES ET AL  2,526,192
TANK GAUGE
Filed May 2, 1945
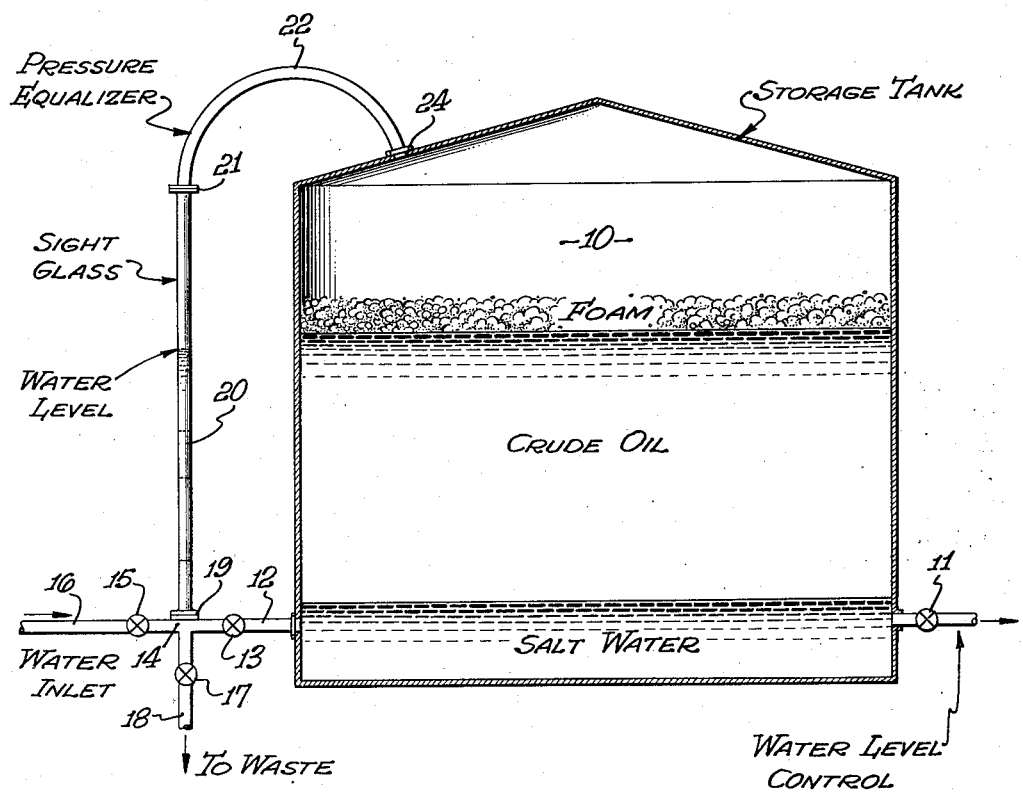
Willis R. Battles,
Franklin R. Wade,
INVENTORS.
BY Ross J. Garofalo
ATTORNEY.

Patented Oct. 17, 1950

2,526,192

UNITED STATES PATENT OFFICE 2,526,192

TANK GAUGE

Willis R. Battles, Redondo Beach, and Franklin R. Wade, Huntington Beach, Calif., assignors to Union Oil Company of California, Los Angeles, Calif., a corporation of California Application May 2, 1945, Serial No. 591,576

4 Claims. (Cl. 73—323)

This invention relates to a tank gauge, and while the gauge may be employed in the measurement of any liquids in tank storage, it finds particular application in the gauging of crude oil so stored.

The measurement of petroleum liquids in storage may be divided into three sections: the calibration of the tanks, the operation of gauging the liquid within the tank, and the methods employed for calculation of its weight or volume. The present invention is concerned primarily with the gauging of the tank, and to a lesser extent with the related problem of calculation of weight or volume. Three different systems of measurement may be employed for determining the volume of oil contained in calibrated vessels; firstly, gauging, or dipping, secondly, ullaging which involves a measurement of the distance of the liquid surface below certain fixed gauge points, and thirdly, gauge class systems or floats may be employed.

Each of these systems for determining the liquid level of the fluid in the storage vessel depends upon an accurate determination of the surface of the liquid, and errors are introduced in cases where the surface of the liquid is disturbed by the presence of foams or emulsions. A great many crude oils, and particularly low gravity asphaltic base crude oils, have a tendency upon standing to form a layer of foam on their surface varying from an inch to a foot or more in depth. This foam formation is due to the entrained light hydrocarbon in the crude and is a function of the viscosity of the crude. The presence of such a foam will inevitably cause difficulty in the determination of the level of the oil in a tank by the conventional methods as above described. Thus, in the first of these methods involving the use of the steel dipping tape, the exact surface of the oil is difficult to determine and to distinguish from the mark on the tape caused by the foam itself. Similarly, in the conventional gauge glass system, the tendency of oil to foam creates difficulties in reading of the glass and particularly in the case of crude oil such glasses quickly become fouled to the point where they are impossible to read. The importance of an error in the measuring of the surface of the oil is readily appreciated when it is seen that a variation of only one inch in the standard A. P. I., 59,000 barrel storage tank involves an error of some seven hundred gallons of crude oil.

It is an object of our invention to provide an improved method and apparatus for determining the liquid level in a liquid storage tank and particularly in a crude oil storage tank which is difficult to gauge by conventional methods because of formation of a layer of stable foam on the liquid surface.

It is a further object of our invention to provide a method for accurately determining the oil level in a crude oil storage tank which is reproducible and extremely simple.

Another object of our invention is to provide an apparatus for the accomplishment of the foregoing ends which is economical in its application and construction.

A more specific object of our invention is to provide a new and novel sight glass arrangement and method of operation thereof to be employed in the gauging of liquid storage tanks.

Other objects and advantages of our invention will become apparent to those skilled in the art as the description thereof proceeds.

The conventional sight glass as may be used on storage vessels involves the flow of the stored liquid from the vessel into the sight glass, the height in the glass equalling the height in the storage vessel. It is because of this that the measurement of crude oil levels and particularly crude oil which has a tendency to foam, is virtually impossible by means of the sight glass as heretofore employed. The essence of our invention lies in the reversal of the normal course of flow from the tank to the sight glass so that the liquid in the sight glass is caused to flow therefrom into the storage tank. This effect may be more readily understood by reference to the accompanying diagram of the apparatus of our invention. The apparatus, as shown in elevation, is connected to a conventional crude oil storage tank.

In the drawing, a conventional crude oil storage tank is shown containing a layer of salt water and a layer of crude oil. Affixed to this tank is a sight glass arrangement by which we are able to accomplish the reverse flow as described above. More specifically, the arrangement comprises a pipe 12 leading from storage tank 10 and controlled by valve 13 into the T arrangement 14 controlled by valves 15 and 17 and projecting therefrom into lines 16 and 18 respectively. Leading from the upper section of T 14 and connected thereto by means of flange 19 is sight glass 20 extending to a height equal to that of tank 10 and connected at such level by means of flange 21 to a connecting line 22 extending from flange 21 to the top of storage tank 10. This connecting line 22 attached to tank 10 with flange 24 is open into tank 10 and serves as a pressure equalizer between the tank and the sight glass. It should be pointed out that sight glass 20 may be any conventional arrangement by which it is possible to read a liquid level on the column such as plastic, windowed tubing, glass pipe or the like, and the term sight glass as used herein encompasses any and all of these various means. Further pressure equalizer 22 is not essential to the invention inasmuch as any means of pressure correction may be employed.

In the operation of this apparatus, valves 13 and 15 are closed and valve 17 is open to allow the liquid remaining in the sight glass from the previous measurement to flow therefrom to waste.. Valve 17 is then closed and valve 15 is opened, fresh water being passed therethrough by means of line 16 into the T 14 and into sight glass 20. The sight glass is thereby filled to a level somewhere above the level of the oil in the tank and valve 15 is closed. At this point valve 13 is opened permitting the water in the sight glass to flow from the sight glass into the storage tank until the water level in the sight glass corresponds on the basis of comparative densities to the crude oil level in the storage tank. In the storage of crude oils a water layer usually forms at the bottom of the tank and such water must be taken into account in the measurement of the crude oil volume. This is usually done by some means of water level control represented in the drawing by outlet 11. Numerous methods are employed for maintaining a predetermined level of water in such storage tanks which methods are not defined by the present invention and are represented generically by the water level control 11.

In the actual determination of the quantity of liquid in a tank, particularly of crude oil, there are four variables which must be determined; namely, gravity of the oil, water content of the oil, water level in the tank, and the oil level in the tank. The gravity and water content of the crude oil are determined in the normal course of physical tests on the oil. The water level as pointed out above is usually determined by maintaining the water in the tank at a predetermined level. Having determined the level of the water layer in the tank and the level of the water in the sight glass, as well as the gravity and water content of the crude oil, it is possible by simple calculation to determine the oil level in the tank and also the total quantity of oil therein. It is necessary for these calculations to determine the temperature of the oil in the tank and the water in the sight glass to correct to equivalent gravities. This may be done by any desired method such as the immersion of a thermometer in the sight glass, by measurement of the effluent stream of water immediately after the determination or the like.

For example, if we assume a storage tank containing a crude oil of 22.5° A. P. I. gravity at a storage temperature of 78° F. and a water column as determined by the sight glass of our invention of 21.4 feet (as measured from the base of the tank or if preferred from the controlled water level of the storage tank) at 70° F. the volume calculation of the oil may be made as follows:

$$H = h \times \frac{dw}{do} - c$$

Where
$H$ = the level of crude oil in the tank.
$h$ = the height of the water in the sight glass.
$dw$ = the absolute density of water at the temperature of measurement.
$do$ = the absolute density of the wet crude oil at the temperature of measurement.
$c$ = the equivalent height of salt water above the opening of the sight glass into the tank. This value will remain constant on production from any given well.

Thus in the example the equation becomes $$H = 21.40 \times \frac{.999}{0.919} - c$$
$$= (23.26 - c) \text{ ft.}$$

This figure of (23.26—c) ft. will represent the absolute height of the oil above the predetermined water level in the tank, the value c becoming zero if the sight glass orifice is at a point corresponding to the controlled water level in the tank. From the oil level value a simple calculation will give the actual volume in a calibrated tank which may be readily corrected to a dry basis by subtracting the volume of the entrained water.

In the operation of the sight glass as described, it is not essential that water be the liquid employed. In this regard three factors are of importance although they are not critical to the invention. Firstly, it is preferable to employ liquid of higher specific gravity than the oil or fluid to be measured inasmuch as the use of a measuring liquid of lower specific gravity would in certain cases necessitate the use of a sight glass extending above the storage tank in order to insure liquid flow from the gauge to the tank. Secondly, it is preferable to use a liquid such as water which will not discolor the sight glass and which will permit a large number of readings of the glass without intermittent cleaning. Thirdly, it is preferable to use a liquid which upon flowing from the sight glass into the storage tank will not seriously contaminate the liquid in the storage tank. Thus, in the present description, the water flowing from the sight glass into the crude oil storage tank increases only the water level in the storage tank and this to a very small extent. Other liquids which may be employed in the sight glass, however, include diethylene glycol, propylene glycol, other glycols, various alcohols and particuarly propyl-alcohol, the higher boiling alcohols and the like. However, for all practical purposes water appears to be the most satisfactory measuring liquid primarily from an economic standpoint.

Whereas the description of our invention has emphasized its use in the measurement of crude oil and particularly crude oil which has a tendency to form a stable foam on its surface, it is within the scope of the invention to employ the novel apparatus and method as described for the measurement of the liquid level in any storage vessel. Definite advantages accrue in the use of such a sight glass even when foam formation is not a problem. This is particularly true in those cases where the liquid in storage is highly colored and viscous and as a result precludes the use of a conventional sight glass in its measurement. Further, many modifications of our invention may occur to those skilled in the art without departing from the spirit and scope of the following claims.

We claim:
1. A method for determining the volume of hydrocarbon liquid in a storage tank containing a lower layer of a liquid of higher specific gravity than the hydrocarbon liquid and an upper layer of hydrocarbon liquid, which comprises filling a sight glass manifolded to said storage tank to a level above the level of hydrocarbon liquid in said storage tank with a liquid substantially immiscible with and of higher specific gravity than said hydrocarbon liquid while preventing the flow of liquid from the sight glass into the storage tank, adjusting the level of the higher specific gravity liquid in said storage tank to a predetermined level at least as high as the point of entry of the sight glass manifold, subsequently allowing liquid from the sight glass to flow into the storage tank until hydrostatic equilibrium is attained, determining the level of indicating liquid in said sight glass and calculating therefrom the differential level of hydrocarbon liquid in the storage tank.

2. A method for determining the volume of crude petroleum oil in a storage tank containing crude petroleum oil having a layer of foam on its surface, thus preventing the determination of liquid level and a lower layer of water which comprises filling a sight glass manifolded to said storage tank to a level above the level of hydrocarbon liquid in said storage tank with water while preventing flow of said water into said storage tank, adjusting the level of water in said storage tank to a predetermined level at least as high as the point of entry of said sight glass manifold, subsequently allowing water to flow from said sight glass into said storage tank until hydrostatic equilibrium is reached and calculating the volume of crude oil from the level of water in said sight glass.

3. A method according to claim 1 in which said liquid, substantially immiscible with and of higher specific gravity than said hydrocarbon liquid, is a glycol.

4. A method according to claim 1 in which said liquid, substantially immiscible with and of higher specific gravity than said hydrocarbon liquid, is an alcohol.

WILLIS R. BATTLES.
FRANKLIN R. WADE.

REFERENCES CITED

The following references are of record in the file of this patent:

UNITED STATES PATENTS

| Number | Name | Date |
| --- | --- | --- |
| 1,619,919 | Cook | Mar. 8, 1927 |
| 1,708,942 | Floyd et al. | Apr. 16, 1929 |
| 2,049,068 | Loupe | July 28, 1936 |

OTHER REFERENCES

Pages 98 and 99 of the Elementary Treatise on Physics by Ganot (Atkinson), 15th ed., rev. and enl., 1898. Published by Longmans, Green and Co., 39 Paternoster Row, London.